United States Patent Office 3,280,194
Patented Oct. 18, 1966

3,280,194
CONVERSION OF DIBORANE TO ALKYL-
DECABORANE
Carl E. Pearl, Azusa, and Harry W. Heidsman, West
Covina, Calif., assignors to the United States of America as represented by the Secretary of the Air Force
No Drawing. Filed June 9, 1964, Ser. No. 373,888
2 Claims. (Cl. 260—606.5)

This invention concerns the herein described one-step process for converting diborane into an alkyldecaborane.

The present large scale method for converting diborane into alkyldecaborane involves two separate reaction steps. This invention accomplishes the same conversion by a one-step process that is described herein.

The object of the present invention is to accomplish the conversion of diborane into an alkyldecaborane by a single step process.

Another object is to provide a new and improved process that is applicable to large scale production at savings in reaction time, labor costs, in equipment costs, and in capital equipment investment. The savings in capital equipment is in that the overall process is accomplished by the use of one chemical reactor, rather than by the use of two reactors that were required in the earlier processes.

The alkylated decaboranes are used as fuel components in the operation of rockets, ramjet motors, and the like.

The alkylated decaboranes represent a new class of materials that are capable of developing into a large variety of chemical products.

The synthesis that is disclosed herein is an improvement in the method of manufacture of the whole family of alkylated decaboranes. Illustrative alkyl groups are the methyl, ethyl, propyl, butyl, and amyl substitution products of decaboranes. A general formula for the family of alkylated decaboranes derived from hexane and wherein the letter $n$ is an integer of from 1 to 10, is:

$$(C_6H_{13})_nB_{10}H_{14-n}$$

Diborane has the composition $B_2H_6$. Diborane is known also as boron hydride and as boroethane. Diborane at room temperature and at one atmosphere pressure is a colorless gas that boils at −92.5° C.

The term alkyl is a general term for any radical of the methane series.

The term decaborane is applied to the boron hydride of the composition $B_{10}H_{14}$. Decaborane is a colorless needle of rhombic structure of the melting point 99.7° C.

The work out of which this invention arose involved the heating under pressure of solutions of diborane in normal hexane at temperatures about within the range of from 100° C. to 200° C. The pressure under which the solutions were maintained is adequate to keep both reactants in their liquid state during the time of the reaction. An illustrative pressure is 900 p.s.i. reading on a pressure gage.

The reaction occurs in the presence of preferably a Friedel-Crafts catalyst, of which representative examples are aluminum chloride, hydrogen chloride, boron trichloride, chlorinated diboranes, monochloroborane and dichloroborane, in their liquid phase.

Cracking catalysts that are similarly useful in reacting diborane with n-hexane include natural clays, alumina, and silica. The function of the cracking catalysts is believed to be to divide the n-hexane molecule into metastable fragments which combine with the decaborane being formed concurrently as a result of diborane pyrolysis.

The reaction is accomplished under a flow system with the residence time of the reactants in the heated zone illustratively varied between 5 and 10 minutes.

The high temperature boiling oils that are isolated from the resultant mixtures are shown by infrared analysis to be alkyl decaborane.

The following example of the process is representative of the present invention.

A charge is prepared by mixing together 344 grams of diborane $B_2H_6$, and 5581 grams of n-hexane $C_6H_{14}$, with a desired catalyst quantitatively in slight excess of that needed.

The mixed charge is caused to pass through a reaction tube reactor that is maintained at a chosen temperature, such as within the range of from 110° C. to 140° C. The mixed charge remains within the hot reaction tube for about between 5 and 10 minutes.

Controlled physical conditions maintain the system pressure at 900 p.s.i.g. The residence time in the heated zone is illustratively 3.4 minutes, and the equilibrium temperature is maintained illustratively at 124° C.

At the exit end of the reaction tube the mixture is expanded through an orifice into a flash chamber at a pressure of about from 5 to 10 p.s.i.g.

The reaction mixture is filtered and is concentrated by distillation to about 200 ml. volume. The concentrate is then cooled and illustratively 13.1 grams of decaborane precipitates out of the cooled concentrated solution.

The precipitated decaborane is removed from the cooled solution by filtration. The filtrate is concentrated to dryness by distillation. An additional 2.2 grams of decaborane is obtained by vacuum sublimation at 60° C. from the distillation residue, raising the total decaborane precipitates to 15.3 grams. The remaining liquid is distilled at from 100 to 104° C. under a pressure of 5 mm. Hg to produce 1 ml. of colorless, viscous oil.

The oil so produced is identified from its infrared spectrum. The spectrum bands attributable to decaborane indicate the presence of the decaborane skeleton. Most of the decaborane bands are shifted, indicating that the decaborane is substituted.

|  | Wavelength, Microns | | | | | | | | | |
|---|---|---|---|---|---|---|---|---|---|---|
| Decaborane | 4.00 | 6.65 | 9.97 | 10.40 | 10.88 | 11.10 | 11.66 | 12.30 | 13.10 | 13.90 |
| Oil Produced | 3.95 | 6.72 | 10.05 | 10.32 | 10.88 | 11.08 | 11.70 | 12.33 | 13.00 | 13.90 |

In addition to bands attributable to decaborane, absorptions are at 3.5–3.6 (CH), 6.9 (CH₃), 7.15 (CH), 7.52 and 8.22 (present in long chain hydrocarbons), 8.80 (BC), 9.30 (CH), 9.54 (methyl, ethyl, n-propyl), and 12.63 (ethyl, propyl).

The described single step process produces, by the reaction of diborane with n-hexane at temperatures in about the range between 100 and 200° C., mono, di, tri, tetrahexyldecaborane, etc., in the liquid phase.

It is to be understood that limited modifications may be made in the disclosed single step process through changes in the quantities of reactants, reagents, temperatures, times, and disclosed equipment, without departing from the spirit and the scope of the present invention.

We claim:
1. The process of making an alkyldecaborane selected from the group that consists of from mono- to tetra-alkyldecaborane by the single step process of reacting diborane with an alkane in their liquid phase, in the presence of a catalyst selected from the group that consists of alum- inum chloride, hydrogen chloride, boron trichloride, chlorinated diboranes, monochloroborane, dichloroborane, clay, silica, and alumina, at a temperature about within the range of from 100 to 200° C., and for a time that is adequate for accomplishing the reaction.

2. The single step process of mixing together as charge diborane and hexane with a catalyst selected from the group of $AlCl_3$, $BCl_3$, HCl, $SiO_2$ in a reaction tube in a pressure chamber, increasing the pressure on the charge to 900 p.s.i., increasing the temperature of the range to 124° C. and maintaining these reaction conditions for 3.4 minutes.

References Cited by the Examiner

Hurd: J. Am. Chem. Soc., vol. 70, pp. 2053 to 2055.

TOBIAS E. LEVOW, *Primary Examiner.*

BENJAMIN R. PADGETT, REUBEN EPSTEIN, CARL D. QUARFORTH, L. A. SEBASTIAN, W. F. BELLAMY, *Assistant Examiners.*